Aug. 8, 1961
N. E. McFADDEN
2,994,916
METHOD AND APPARATUS FOR MELTING GLASS AND
DRAWING FILAMENTS THEREFROM
Filed March 28, 1958
2 Sheets-Sheet 1
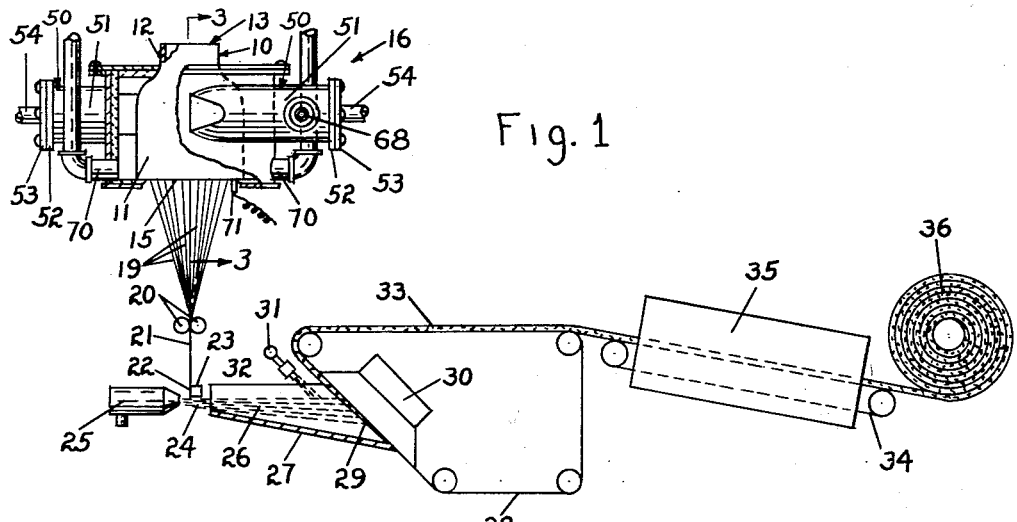
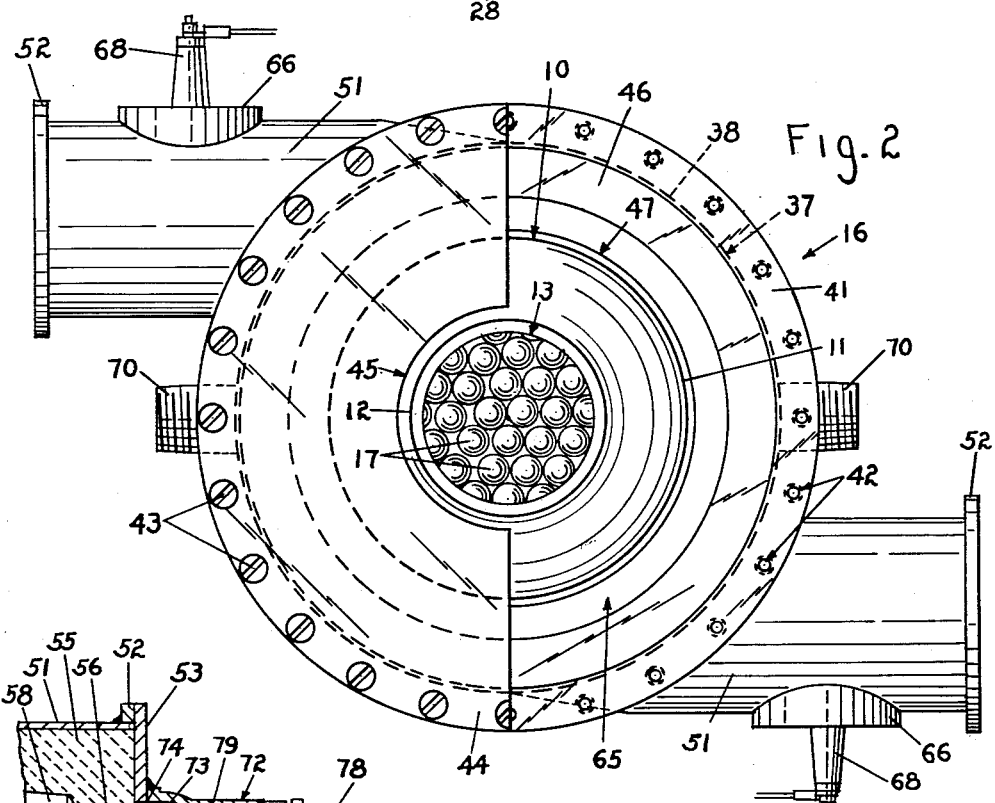
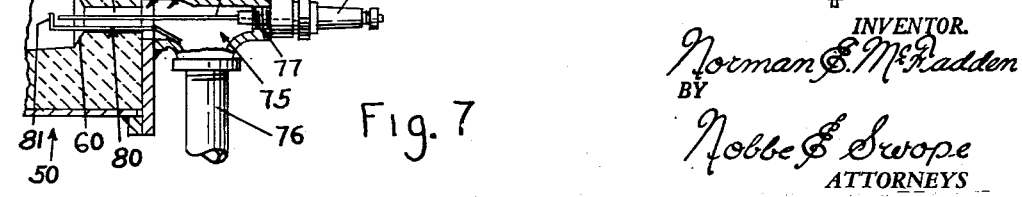
INVENTOR.
Norman E. McFadden
BY
Nobbe & Swope
ATTORNEYS

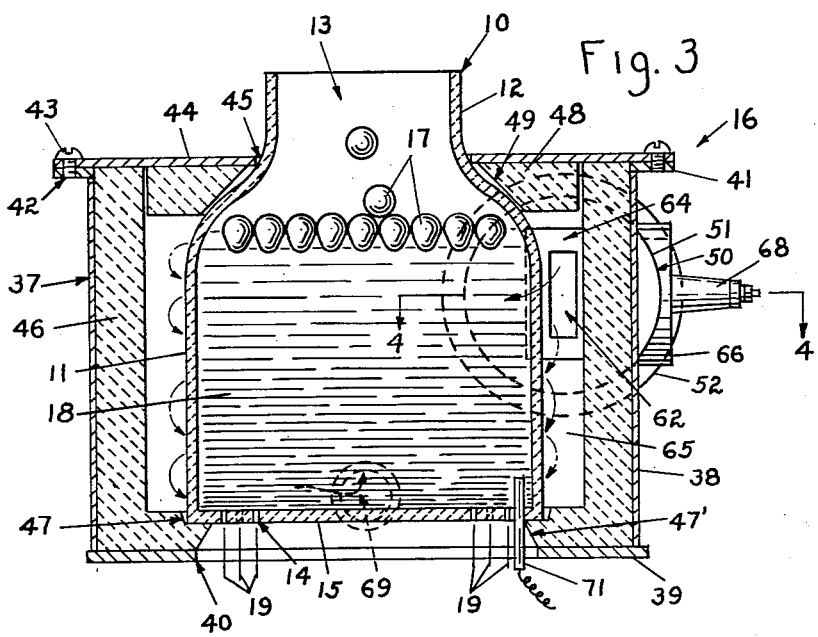
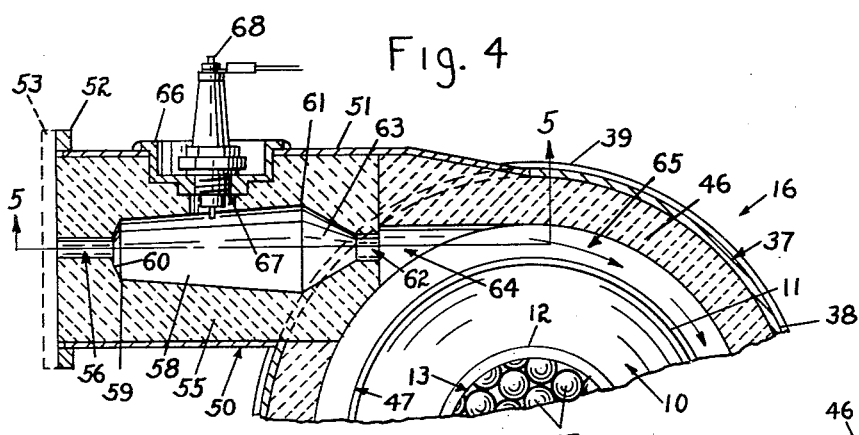
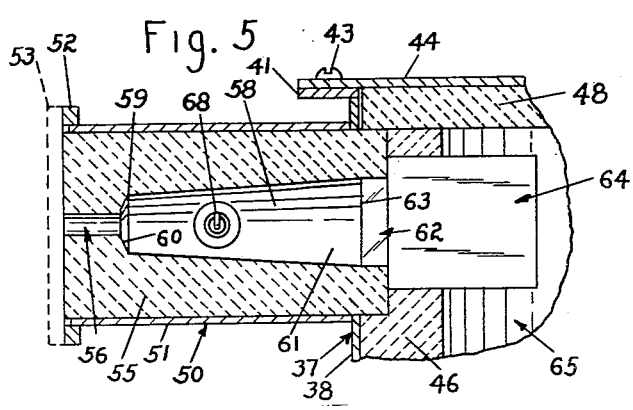
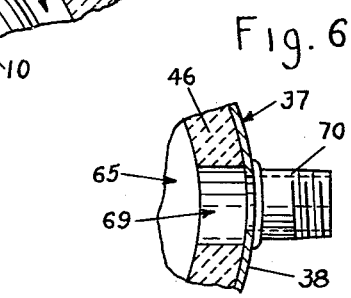

United States Patent Office 2,994,916
Patented Aug. 8, 1961

2,994,916
METHOD AND APPARATUS FOR MELTING GLASS AND DRAWING FILAMENTS THEREFROM
Norman E. McFadden, Defiance, Ohio, assignor, by mesne assignments, to Johns-Manville Fiber Glass Inc., Cleveland, Ohio, a corporation of Delaware
Filed Mar. 28, 1958, Ser. No. 724,709
11 Claims. (Cl. 18—8)

This invention relates broadly to a heat exchange method and its application to a chamber for elevating the temperature of a bushing or crucible made of a refractory material. More specifically, it relates to a method and apparatus for melting a supply of glass contained in a filament drawing bushing made of a refractory material.

In the production of glass fibers for mat making it is customary to heat glass marbles or cullet in a bushing or crucible made of a refractory material to a temperature above the melting point of the glass. In order to conserve energy the bushing is contained within an insulated chamber which is generally fired by a mixture of gas and air. It has been common practice to introduce the fuel near the bottom of the chamber and to exhaust the waste gases from the top of the chamber through a vent surrounding the neck of the bushing. A combustion chamber constructed in accordance with these principles intensifies the heat in the bottom of the chamber adjacent the point of withdrawal of the glass and the temperature at the top of the bushing is considerably lower. The reduced temperature at the top of the bushing is due to a combination of factors, including a gradual reduction in temperature of the gases as they advance through the chamber due to heat transfer to the bushing and the glass, the introduction of cold marbles into the top of the bushing and heat losses through the wall of the chamber, the vent and the open top of the bushing. The temperature differential between the bottom and the top of the bushing is pronounced and a large proportion of the glass within the bushing is below the required drawing temperature. Also, since the glass at the top of the bushing is at a lower temperature, there is a tendency for the glass in this area to adhere to the side of the bushing and to eventually bridge over the molten glass in the bushing. When this occurs, the molten glass below the bridge becomes exhausted after a period of time and drawing ceases until the bridge is broken up. Furthermore, when marbles adhered to the wall of the bushing are dislodged fragments may be broken from the wall and carried into the melt to block one or more of the orifices. This generally entails interrupting production.

In carrying out the invention, I provide a heating chamber defined by an upstanding peripheral wall of the melting bushing and a thermally insulated outer wall and introduce a fluid heating medium into the upper portion of the chamber and exhaust the medium adjacent the lower portion of the chamber. The arrangement of the melting bushing and outer wall is such as to isolate the medium from the molten glass to prevent contamination thereof. In carrying out the heating and concomitant melting of the glass charge according to my invention, it should be appreciated that different and distinct heat transfer processes occur. Within the chamber primarily convective heat transfer occurs between the fluid medium, which may be in the form of heated products of combustion, and the bushing wall. Within the bushing, primarily radiative heat transfer occurs between the inner surface of the bushing wall and the outer peripheral surface of the glass charge, while primarily conductive heat transfer occurs within the molten glass. The introduction of hot gases into the top portion of the chamber also provides a concentrated source of radiant heat energy to the work at the point where the work is the coldest.

In the bottom fired bushings, maintaining a maximum firing rate usually results in overheating the bottom portion of the bushing. Such overheating increases the temperature gradient between the bottom and top portions of the bushings, and causes the marbles to stick to the side of the bushing and to subsequently bridge themselves. To prevent such overheating, operators have to cut down the heat input which results in decreased production.

In the present invention the distribution of heat is controlled without affecting the firing rate by introducing the hottest products of combustion adjacent to the area of the coldest portion of the work, or charge, in a manner which does not substantially decrease the overall effective heat transfer.

It is therefore an object of this invention to enclose a circular ceramic bushing in a circular chamber and to circulate hot gases tangentially of said chamber from the top to the bottom.

It is another object of this invention to provide a method for melting glass and apparatus including an annular heating chamber about a ceramic bushing for the transfer of heat from a hot gas issuing tangentially from a pair of opposed burners near the top of the chamber and exhausting from a pair of opposed ports near the bottom of the chamber.

It is still another object to provide an insulated enclosure for a ceramic bushing wherein the walls of said enclosure and bushing form an annular heating chamber into which hot gases are directed tangentially from a pair of opposed burners.

It is yet another object of this invention to provide a method for melting glass and apparatus including a heat exchange chamber for elevating the temperature of a glass drawing bushing wherein hot gases are circulated in a helically descending path around the periphery of the bushing.

It is still another object of this invention to provide a method and apparatus for melting glass by circulating hot gases in a helically descending path around the periphery of a bushing containing the glass.

Other objects and advantages of the invention will become more apparent during the course of the following description when taken in connection with the accompanying drawings.

In the drawings wherein like numerals are employed to designate like parts throughout the same:

FIG. 1 is a schematic drawing of apparatus for making a bonded mat of glass fibers incorporating the heat exchange chamber forming the subject matter of this invention;

FIG. 2 is a plan view of the heat exchange chamber and the bushing with half of the chamber cover broken away;

FIG. 3 is a section of the heat exchange chamber and the bushing taken on the line 3—3 of FIG. 1;

FIG. 4 is a fragmentary section of the heat exchange chamber and the bushing taken on the line 4—4 of FIG. 3 showing a combustion chamber in detail;

FIG. 5 is another fragmentary section of a combustion chamber taken on the line 5—5 of FIG. 4;

FIG. 6 is a fragmentary section of a gas exhaust port; and

FIG. 7 is a fragmentary section of a modified form of combustion chamber.

FIG. 1 of the drawings schematically illustrates apparatus for manufacturing a bonded mat of glass fibers. The apparatus includes a ceramic bushing 10 having a circular side wall 11 terminating in a reduced circular neck portion 12, open at the top as indicated by the numeral 13 (FIGS. 2 and 3), and provided with a plurality of orifices 14 (FIG. 3) extending through the bottom 15 and arranged in a series of concentric rows.

The bushing is disposed within enclosure, generally indicated by the numeral 16, which will be described in detail hereinafter.

Glass marbles 17 (FIGS. 2 and 3) are fed into the bushing 10 through the opening 13 and hot gases are circulated through the enclosure 16 from top to bottom in encompassing relation to the bushing. Heat is transferred from the gases to reduce the glass in the marbles to a fluid state 18 and to initiate passage of streams 19 of glass through the orifices 14. The streams of glass 19 are grasped between a pair of rolls 20 revolving at a rate in excess of the rate of descent of the streams 19 to attenuate the streams into fine filaments 21.

The filaments are passed over the face 22 of a block 23 and at the lower edge of said face, a hot gaseous blast 24, generated by a battery of burners 25, impinges upon the filaments thereby further attenuating the filaments and reducing them to fibers 26 of varying length. The blast 24 directs the fibers in a substantially horizontal direction through a trough 27, adapted to shut out stray air currents which tend to entangle the fibers, and deposits the fibers in jackstraw fashion upon a foraminous endless conveyor 28. The area of fiber deposition on the conveyor is known as the collection area 29 and at this point a vacuum is applied to the rear of the conveyor through a hood 30 to draw the fibers onto the conveyor. A spray 31 wets the fibers 26 with a thermosetting binder 32 as they approach the collection area. The bonded, but uncured mat 33, is advanced by the conveyor 28 and deposited on another conveyor 34 which passes the mat through an oven 35 to cure the binder. Thereafter the mat is formed into a package 36, as by winding.

Referring now to FIGS. 2 through 6, inclusive, the enclosure 16 housing the bushing 10 includes an outer steel shell 37. The shell is comprised of a tubular body 38 with an annular bottom 39 having a central opening 40 (FIG. 3) and a flange 41 circumscribing the top of the shell. A plurality of tapped holes 42 extend through the flange 41 and cooperate with screws 43 to retain a flat circular cover 44 made of steel plate. A circular hole 45 is formed centrally through the cover 44 and sealingly engages the neck 12 of the bushing 10.

The interior of the shell and the top face of the bottom 39 is lined with a high temperature refractory insulating material 46. A circular recess 47 is formed in the ceramic material 46 concentric with the opening 40 in the bottom 39 and serves as a seat for the bushing 10. An opening 47′ extends from a diameter concentrically circumscribing the orifices 14 in the bushing 10 in a downwardly diverging conical configuration to merge with the opening 40 in the bottom of the enclosure 16.

The inner surface of the cover 44 is lined with a ceramic material 48, leaving an opening 49 therein diverging downwardly and outwardly from the opening 45 in the cover 44 to provide clearance for the neck 12 of the bushing 10.

A pair of combustion chambers 50, of identical configuration, enter the shell 37 tangentially in diametrically opposed relation adjacent the top flange 41. Since the chambers 50 are identical, the following description, though singular, is applicable to both. The chamber 50 is contained in a cylindrical metal tube 51 with one end welded to the body 38 and the other end carrying a flange 52 in circumscribing relation. A companion flange 53 provided with a centrally disposed pipe nipple 54 (FIG. 1) is mounted in sealing face-to-face relation with the flange 52 and serves to admit a fuel mixture, such as gas and air, into the chamber 50.

The combustion chamber 50 is formed by coring a high temperature refractory material 55 and lining the tube 51 therewith. The cored section is divided into a tubular inlet 56 in communication with the fuel inlet fitting 54 and joining with the chamber 50. The interior of the chamber 50 is in the form of a truncated cone 58 with the smaller terminal diameter 59 joined to the inlet 56 by a frusto-conical section 60. The larger terminal diameter 61 of the truncated cone 58 is joined to a rectangular discharge port 62, having the major dimension disposed vertically, by a transitional section 63. As shown in FIGS. 3, 4 and 5, the refractory material 46 lining the shell body 38 is provided with a recess 64 to admit the hot gases from the combustion chamber 50 into heating chamber 65 defined by the side wall 11 of the bushing 10 and the inner wall of the refractory shell lining 46 in tangential relation to the upper part of the heating chamber 65, as is shown in FIGS. 3 and 4.

A flanged well 66 having a centrally disposed internally threaded opening 67 enters one side of the tube 51 and receives a spark plug 68 which is fired electrically for initial ignition of the fuel mixture within the combustion chamber 50. Thereafter, the flame is self-propagating.

Referring particularly to FIG. 6, a pair of exhaust ports 69 pass through the refractory material 46 and the shell body 38 in diametrically opposed relation to each other and serve to convey the exhaust gases from the lower portion of the heating chamber 65 into exhaust pipes 70.

A thermocouple 71 is shown in FIGS. 1 and 3 immersed in the molten glass 18 adjacent the openings 14 and is electrically connected in a manner well-known in the art to regulate the rate of marble feed into the bushing 10 to volumetrically balance the input with the output.

The preferred form of this invention includes two opposed combustion chambers and two gas exhaust ports respectively joining the heating chamber 65 as close to the top and bottom thereof as is feasible. It has been found by experimentation that this arrangement provides a flow of the hot gas about the bushing in a pair of helically descending paths which are phased at 180° resulting in an even distribution of the heat within the passage surrounding the bushing. However, in some instances it has been found that excellent results have been obtained with a single combustion chamber and a single exhaust port. Likewise, it is considered within the scope of this invention to generate the hot gases at a point remote from the bushing, and in this instance the combustion chambers could be omitted and the gases be introduced to the ports 62 through a manifold.

Similarly, it is believed within the scope of this invention to increase the number of combustion chambers and inlet and outlet ports to more than two each, if conditions warrant. However, excellent results have been obtained with two inlet and two outlet ports disposed as disclosed above.

The modified form of the combustion chamber 50 shown in FIG. 7 provides a novel method of positioning the electrodes of a spark plug in the combustion chamber without perforating the wall thereof. A T 72 is welded to the outer face of the compression flange 53 with one opening 73 therein circumscribing a central opening 74 in the flange and with a fuel inlet opening 75 with its attached pipe 76 at right angles to the axis of the openings 73 and 74. The other opening 77 in the T 72 is concentric with the axis extending through the openings 73 and 74 and is internally threaded to receive a spark plug 78. The spark plug is of special construction with an elongated electrode 79 extending from the plug in axial alignment with the openings 56, 74, 73 and 77 into the truncated cone area 58. The other electrode 80 is welded to the T 72 inside the opening 73 and extends through the openings 56, 74 and 73 in spaced, parallel relation to the electrode 79, terminating in a hooked portion 81 to provide the proper spark gap between the electrodes. The spark plug functions only to initiate combustion as the flame is self-propagating when the combustion chamber becomes heated to the ignition temperature of the fuel.

The location of the spark plug in the position shown in FIG. 7 also extends the life of the electrodes since they are in a cooler portion of the combustion chamber and since the refractory wall of the combustion chamber is not perforated, there is less likelihood of failure of the combustion chamber due to the high temperature.

Although this invention is primarily intended for use with a bushing made of a refractory material and is so described, it is not intended to preclude the application of the principles disclosed herein to include apparatus wherein the bushing is made of a suitable metal, such as platinum, alloys of platinum and rhodium and others which are resistant to the destructive forces of heat, corrosion and erosion.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

I claim:

1. In combination with a bushing for melting glass and drawing filaments therefrom, wherein the bushing is comprised of a body portion and a neck portion, a thermally insulated enclosure sealingly encompassing said body portion in spaced relation to define a heating chamber, a combustion chamber in communication with a pressurized source of a combustible mixture, means for igniting said mixture within said combustion chamber, a port for said combustion chamber directed to discharge the hot gases of combustion tangentially into the upper portion of said heating chamber, said enclosure and said bushing being arranged to isolate said hot gases of combustion from the interior of said bushing and a port in communication with the lower portion of said heating chamber for exhausting said gases from said heating chamber.

2. In combination with a bushing for melting glass and drawing filaments therefrom, wherein the bushing is comprised of a body portion and a neck portion, a thermally insulated enclosure sealingly encompassing said body portion in spaced relation to define an annular heating chamber, a pair of combustion chambers in communication with a source of a combustible mixture under pressure, electrical means for igniting said mixture within each of said combustion chambers, a port for each of said combustion chambers directed to discharge the hot gases of combustion tangentially into the upper portion of said annular heating chamber, said enclosure having a portion sealingly engaging said neck portion in a manner whereby said hot gases are isolated from the interior of said bushing at diametrically opposed points, and a pair of ports in communication with the lower portion of said heating chamber at diametrically opposed points for exhausting said gases from said heating chamber.

3. In combination with a bushing for melting glass and drawing filaments therefrom, wherein the bushing is comprised of a body portion and a neck portion, a thermally insulated enclosure sealingly encompassing said body portion in spaced relation to define an annular heating chamber, a pair of diametrically opposed exhaust ports connecting the lower portion of said heating chamber to the atmosphere, a pair of combustion chambers in communication with a source of a combustible mixture under pressure, means for igniting said mixture within said combustion chambers, and a port connecting each of said combustion chambers with said heating chamber at diametrically opposed points to direct the hot, gaseous products of combustion in a helically descending path within said heating chamber to said exhaust ports.

4. The method of melting glass including the steps of, introducing a pressurized stream of hot gases tangentially into the upper portion of a heating chamber encompassing a melting bushing containing a charge of glass, circulating said gases in a downwardly descending spiral out of contact with the glass within said chamber to transfer heat from said gases to the vertical wall of said bushing and exhausting said gases from said chamber at a point adjacent the bottom of the chamber.

5. The method of melting glass including the steps of, introducing two pressurized streams of hot gases tangentially into the upper portion of a heating chamber, encompassing a melting bushing containing a charge of glass, at diametrically opposed points, circulating said gases out of contact with the glass in a pair of downwardly descending spirals within said chamber to transfer heat from said gases to the vertical wall of said bushing and exhausting said gases from said chamber at two diametrically opposed points adjacent the bottom of the chamber.

6. The method of melting glass as defined in claim 5 wherein the temperature of said gases is in excess of the melting temperature of said glass.

7. The method of melting glass including the steps of, introducing a plurality of pressurized streams of hot gases tangentially into the upper portion of said passage at equal angular intervals, circulating said gases out of contact with the glass in downwardly descending spirals within said passage to transfer heat from said gases to the vertical wall of said bushing, and exhausting said gases from said passage at a plurality of points adjacent the bottom of said passage.

8. In apparatus for melting glass and drawing filaments, the combination comprising: a bushing having a peripheral wall for containing a supply of glass; a thermally insulated enclosure in spaced relation with said bushing defining a heating chamber therebetween; a source of fluid heating medium; means for introducing said medium tangentially into the upper portion of said chamber; and means for exhausting said medium adjacent the bottom portion of said chamber, said chamber being arranged to isolate said medium from said supply of glass.

9. In apparatus for melting glass and drawing filaments therefrom, the combination comprising: a bushing having a peripheral wall for containing a supply of glass; a thermally insulated enclosure in spaced relation with said bushing defining a heating chamber therebetween; a burner portion to discharge heated products of combustion tangentially into the upper portion of said chamber; and means for exhausting said products of combustion adjacent the bottom portion of said chamber, said chamber being arranged to isolate said products of combustion from said supply of glass.

10. In apparatus for melting glass, the combination comprising: a melting bushing having a main body portion and a neck portion; a thermally insulated enclosure in spaced relation with said bushing to define a heating chamber therebetween; a source of hot products of combustion; means for directing said products of combustion into said chamber tangentially of said bushing, said enclosure having a portion sealingly engaging said neck portion in a manner whereby said products of combustion are isolated from the interior of said bushing; and exhaust means for exhausting said products of combustion adjacent the bottom portion of said chamber.

11. The method of melting glass comprising: introducing through a tangential port a supply of hot products of combustion into the upper portion of a heating chamber, circumposing a melting bushing, in a manner whereby said products of combustion constitute a source of concentrated radiant heat to the upper portion of said bushing; circulating said products of combustion downwardly and contiguously to the side wall of said bushing; and exhausting said products of combustion adjacently of the lower chamber portion.

References Cited in the file of this patent

UNITED STATES PATENTS

| | | |
|---|---|---|
| 1,874,799 | Peiler | Aug. 30, 1932 |
| 2,080,625 | Miller | May 18, 1937 |
| 2,226,498 | Koob | Dec. 24, 1940 |
| 2,306,462 | Moorman | Dec. 29, 1942 |
| 2,455,908 | Slayter | Dec. 7, 1948 |
| 2,814,657 | Labino | Nov. 26, 1957 |